July 12, 1938. J. COTAL 2,123,770
CLUTCHING AND SPEED CHANGING MECHANISM
Filed Nov. 26, 1937
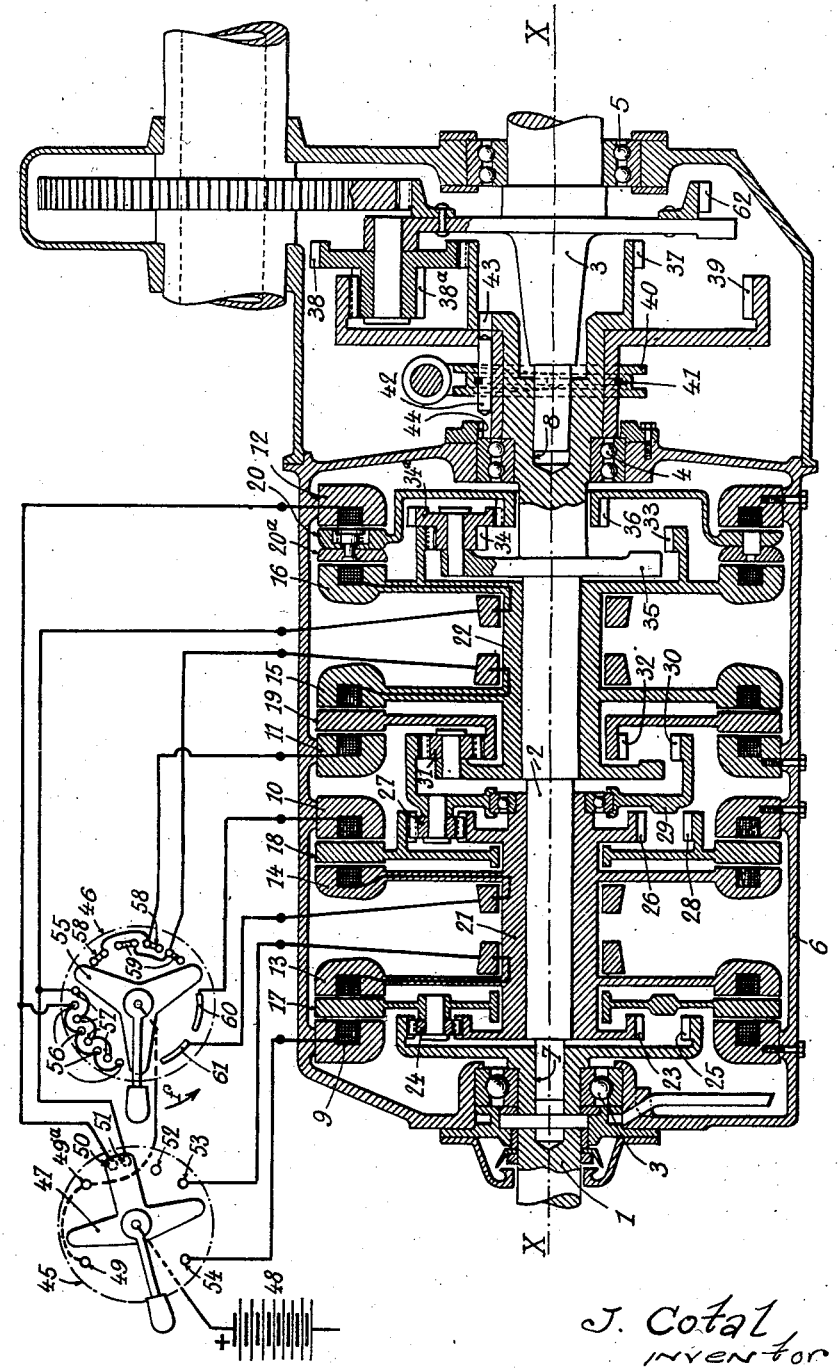
J. Cotal
Inventor
by Glascock Downing & Seebold
Attys.

Patented July 12, 1938

2,123,770

UNITED STATES PATENT OFFICE 2,123,770

CLUTCHING AND SPEED-CHANGING MECHANISM

Jean Cotal, Paris, France

Application November 26, 1937, Serial No. 176,739
In France November 30, 1936

7 Claims. (Cl. 74—268)

The present invention has for its object a clutching and speed-changing mechanism which is chiefly characterized by the fact that it comprises, in combination, the following devices which consist of sets of hypocycloidal gearing, as follows:

A device for reversal of motion, under electric control.

An assemblage of planetary gear sets, under electric control, which permits of obtaining four, six, eight or more speeds, which are properly spaced apart.

A speed-reducing device under mechanical control which permits of transmitting to the driven shaft, either the speeds such as they are given by the devices under electric control, or these speeds which are reduced in a determined ratio.

According to another feature, the mechanism further comprises a device for braking the driven shaft, which utilizes the electro-mechanical parts of the last planetary set which operates under electric control.

The various devices may be actuated from a distance by means of one or more switches, and of electric wiring.

When the said invention is applied to certain machine-tools, or automatic lathes, use is made of two switches which are adapted for braking, stopping or reversal of motion, while at the same time remaining at any given speed. Such driving and controlling devices may be situated, for instance, upon the movable slide and within reach of the workman, who is thus enabled, without changing his place and simply by his action upon a handle to effect the reversal of motion, change the speed combination in engagement, brake and stop the spindle.

These means for control will reduce the fatigue of the workman, and will also afford an increased efficiency.

The mechanism as a whole is quite substantial, the gearing being always in engagement. It has a very reduced size, and can be readily contained in the fixed stock or the machine frame.

The following description will set forth other features.

The accompanying drawing shows by way of example and in longitudinal section, a constructional form of a mechanism in conformity with the invention providing sixteen speeds which are suitably spaced apart in each direction, with uncoupling, and with a braking device for the driven shaft.

In the present embodiment, the mechanism comprises a driving shaft 1 which is coaxial with an intermediate shaft 2, followed by a driven shaft 3. These shafts are mounted in bearings 3, 4, 5 in the interior of a casing 6. On the other hand, the end of the shaft 2 is rotatable in a bore 7 formed in the shaft 1, and in like manner, the end of the shaft 3 is rotatable in a bore 8 formed in the shaft 2.

On the casing 6 are mounted the electro-magnets 9, 10, 11 and 12.

Other rotatable electro-magnets 13, 14, 15, 16 are mounted symmetrically to the said fixed electro-magnets, with reference to the rotatable armatures 17, 18, 19, 20, 20$^a$ which are respectively situated between the said electro-magnets, with which they are adapted to make contact.

The electro-magnets 13 and 14 are positively secured to a hollow shaft 21 which is centered on the intermediate shaft 2. The armatures 17 and 18 are centered on the said hollow shaft 21.

In like manner, the electro-magnets 15 and 16 participate in the rotation of a hollow shaft 22, on which the armature 19 is centered.

The armature 20 is centered directly on the shaft 2, and it participates in the rotation of the armature 20$^a$.

The hollow shaft 21, which is centered on the intermediate shaft 2, is secured on the left-hand side to a sun-wheel 23 in engagement with planetary pinions 24 which are mounted on the armature 17 and which also engage an orbit wheel 25 with internal teeth, mounted on the driving shaft 1.

The hollow shaft 21 is secured on the right-hand side to a second sun wheel 26 engaging the planetary pinions 27 which are also in engagement with an orbit wheel 28 with internal teeth secured to the armature 18, which is centered on the hollow shaft 21.

The planetary pinions 27 are mounted on a disc 29 concentric with the shaft 2. The disc 29 further carries an orbit wheel 30 with internal teeth, in engagement with planetary pinions 31 which are also engaged with a central sun wheel 32 secured to the armature 19 which is centered on the shaft 22.

The said shaft 22 is secured to an orbit wheel 33 with internal teeth. The said orbit wheel engages the small teeth 34 of the double-toothed planetary pinions 34, 34$^a$, whose axles are mounted upon a disc 35 which is integral with or is separately secured to the end of the shaft 2. The large teeth 34$^a$ of the said pinions are in engagement with a central sun wheel 36 secured to the armature 20.

At its right-hand end, the intermediate shaft 2 is secured to a central sun wheel 37 engaging the large teeth 38 of the planetary pinions having two sets of teeth 38, 38ᵃ, whose small teeth 38ᵃ are in engagement with an orbit wheel 39 having internal teeth, which is centered on the intermediate shaft 2. The axles of the planetary pinions 38, 38ᵃ are mounted on a disc which is secured to the driven shaft 3.

Upon the hub of the main wheel 39 is mounted a slidable sleeve 40.

A circular segment 41, which is partially inserted into an internal groove in the sleeve 40, is also engaged with keys or pins 42, partly contained in longitudinal slots which are parallel with the axis of rotation XX and are spaced around the hub of the orbit wheel 39.

When suitable means are employed to displace the sleeve 40 to the right, the pins 42 will enter holes 43 formed in the shaft 2, thus connecting the orbit wheel 39 with this shaft. When the said sleeve is moved to the left, the pins 42 are inserted into recesses 44 formed in a member secured to the casing, and thus the orbit wheel 39 is held fast.

In the middle position of the sleeve 40 as shown in the drawing, the orbit wheel 39 can now turn loosely on the shaft 2.

The figure shows by way of example a diagram for the electric control of the aforesaid mechanism. It comprises two circular switches 45 and 46.

The switch 45 is provided with a cross-shaped arm 47 which is connected to one pole of a source of electric current 48. The other pole of the said source is connected to a ground, upon which the circuits are closed. The said switch comprises contact-pieces 49ᵃ, 49, 50, 51, 52, 53, 54. The contact-pieces 49ᵃ and 49 are connected in series to the arm 55 of the right-hand switch 46. The contact-pieces 50 and 51 are connected respectively to the electro-magnets 12 and 16. The contact-piece 52 is insulated. The contact-pieces 53 and 54 are connected respectively to the electro-magnets 13 and 9.

As concerns the switch 46, provided with the arm 55, it comprises:

A set of contact-pieces 56 which are connected together in series and are connected, in parallel with the contact-piece 50 of the switch 45, to the electro-magnet 12.

A set of contact-pieces 57 which alternate with the contact-pieces 56, which contact-pieces 57 are connected together in series and are connected, in parallel with the contact-piece 51 of the switch 45, to the electro-magnet 16.

A set of contact-pieces 58 which are connected together and are connected to the electro magnet 11.

A set of contact-pieces 59 which alternate with the contact-pieces 58, which contact-pieces 59 are connected together and are connected to the electro-magnet 15.

A contact-piece 60 connected to the electro-magnet 10.

A contact-piece 61 connected to the electro-magnet 14.

The contact-pieces of the switch 45 are spaced apart in such manner that the said arm, which may have four positions, can be used to cut off the source of current 48 (idle position), or to supply the current to the electro-magnets 12 and 16, which position is shown in the drawing (for the braking), or to supply current to the rotatable electro-magnet 13 and to the switch 46 (for the forward speeds), or to send current into the stationary electro-magnet 9 and into the switch 46 (for the rear speeds).

The arm 55 of the switch 46 may have different positions which permit of making all the combinations for energizing the electro-magnets in order to obtain the various desired speeds.

The aforesaid mechanism provides for sixteen speeds in each direction of movement.

To obtain the speeds for the forward motion, the operation is as follows:

The arm 47 of the switch 45 is placed in the position which permits of sending the current into the rotatable electro-magnet 13, and of connecting the right-hand switch 46 to the source of current 48.

The armature 17 pertaining to the electro-magnet 13 thus energized, will prevent any relative movement between the sun wheel 23 and the planetary pinions 24, and as these cannot turn upon their axes, they will secure the orbit wheel 25 to the sun wheel 23, and thus the hollow shaft 21 is driven at the same speed as the driving shaft 1.

The sleeve 41 is moved to the right in such way as to secure the orbit wheel 39 to the sun wheel 37. This latter position will be maintained for the eight speeds mentioned hereafter.

The double-toothed planetary pinions (38—38ᵃ) cannot turn, and the driven shaft 3 is thus actuated at the same speed as the shaft 2.

*16th speed.*—The handle of the switch 46 is moved in the direction of the arrow *f* in order to send the current into the rotatable electro-magnets 14, 15 and 16.

This has the effect of locking together each of the three planetary sets in use: in the first set, the wheels 26 and 28 are secured together by the adhesion of the armature 18 to the electro-magnet 14; in the second set, the planetary pinions 31 are secured to the wheel 32 by the adhesion of the armature 19 to the electro-magnet 15; in the third set, the wheels 33 and 36 are secured together by the adhesion of the armature 20ᵃ to the electro-magnet 16. The result will be that the shaft 2 and hence the shaft 3 will be driven at the same speed as the driving shaft 1.

*15th speed.*—The electro-magnets 14, 15 and 12 are energized, and the first two sets in use are held fast as in the preceding case, but in the third set, the armature 20 adheres to the stationary electro-magnet 12, thus holding the small sun wheel 36, around which will roll the large toothed part 34ᵃ of the planetary pinions, the small toothed part 34 of which is actuated by the large orbit wheel 33 which participates in the rotation of the driving shaft 1.

*14th speed.*—The electro-magnets 14, 11 and 16 are energized. In the same way as for the sixteenth speed, the first and third set in question will transmit the movement without reduction, but in the second set, the armature 19 adheres to the fixed electro-magnet 11, thus holding the small sun wheel 32, around which will turn the planetary pinions 31 which are also engaged with the large orbit wheel 30, which participates in the rotation of the driving shaft 1. This affords a speed reduction, which is greater than the preceding for the shaft 22, and hence for the shafts 2 and 3 with which it is connected in rotation.

*13th speed.*—The electro-magnets 14, 11 and 12 are energized. The first set transmits the movement without reduction; the second and third set, as above observed for the fourteenth and fifteenth speeds, reduce the movement, thus affording for the shafts 2 and 3 a slower speed than the preceding.

*12th speed.*—The electro-magnets 10, 15 and 16 are energized. The two second sets transmit the movement without reduction, but in the first set, the armature 18 adheres to the fixed electromagnet 10, thus holding the large orbit wheel 28, in the interior of which the sun wheel 26 causes the planetary pinions 27 to roll, thus giving to the hollow shaft 22 and to the shafts 2 and 3 a slower speed than in the preceding case.

*11th speed.*—The electro-magnets 10, 15 and 12 are energized. To the speed reduction due to the first set (as in the twelfth speed) is added the reduction due to the third set, while the second set transmits the movement without reduction. This affords finally, for the shafts 2 and 3, a slower speed than in the preceding case.

*10th speed.*—The electro-magnets 10, 11 and 16 are energized. The first two sets reduce the speed in succession, and the hollow shaft 22 as well as the shafts 2 and 3 with which it is connected in rotation, are now driven at a slower speed than in the preceding case.

*9th speed.*—The three fixed electro-magnets 10, 11 and 12 are energized. The three speed-reductions are added together, and the shafts 2 and 3 are driven at a slower speed than in the preceding case.

*8th speed.*—If it is desired to still further reduce the speed of the shaft 3, the sleeve 40 is moved to the left, and as its pins 42 enter the recesses 44 of a member secured to the casing, this will hold the large orbit wheel 39, the internal teeth of which engage the small toothed part of the planetary pinions 38, 38ᵃ, whose large toothed part 38 is driven by the small sun wheel 37 of the shaft 2. By the operation of these gear wheels alone, this will afford a greater reduction than the one obtained for the ninth speed by the aggregate of the three speed-reductions in use. In this case, it is simply necessary, in order to obtain the eighth speed, to energize the rotatable electro-magnets 14, 15 and 16 as was done for the sixteenth speed. The shaft 2 is driven at the same speed as the shaft 1, but by the final speed-reducer employed, the shaft 3 will rotate at a slower speed than for the ninth speed.

Again, in order to obtain the seventh, sixth, fifth, fourth, third, second and first speeds, it is simply necessary to respectively energize the electro-magnets, as in the case of the fifteenth, fourteenth, thirteenth, twelfth, eleventh, tenth, and ninth speeds.

This series of sixteen speeds may also be obtained in the reverse direction. For this purpose, the arm of the switch 45 is used to energize the fixed electro-magnet 9 instead of the rotatable electro-magnet 13. The armature 17 adheres to the fixed electro-magnet 9, thus holding the carrier of the planetary pinions 24, and these latter, when driven by the large orbit wheel 25 secured to the driving shaft, will cause the rotation of the sun wheel 23 in the contrary direction.

The movement is then transmitted in this direction, at more or less reduced speeds, by the use of the different planetary gear sets which follow, as observed in the preceding cases.

When in service, should it be desired to brake the shaft 2 and the shaft 3, it is simply necessary to move the arm of the switch 45 and to give it the position shown in the drawing. The electro-magnets 12 and 16 are energized, and each attracts its corresponding armature 20, 20ᵃ; the third set (which is the last set to the right with the electric control) is hence locked together and is held against rotation, thus slowing down and stopping the shaft 2 and therefore the shaft 3.

As above set forth, all of these movements of the controlling switches can be carried out from a distance, and in the case of a lathe, for instance, the workman can effect the same without being obliged to leave his place.

The different planetary sets can be of such construction that their various combinations will afford the desired range of speeds and for instance for lathes, the range in geometrical progression according to Renard.

The planetary pinion carrier which is secured to the driven shaft 3 may be provided with teeth 62 for actuating various controls for the auxiliary mechanisms which serve, for instance, for changes of pitch or of forward feed.

Such teeth may also drive the shaft of the machine, either directly or through transmission gear, as shown in the drawing.

Obviously, the invention is not limited to the embodiment herein described and represented, which is given solely by way of example.

If necessary, the mechanical speed-reducing device may be arranged in order to obtain a certain number of speed reductions which are properly selected, so as to reproduce, if required, a greater number of times the series of eight speeds already obtained by the electric control, thus obtaining a total of twenty-four or thirty-two speeds in each direction.

The invention further relates to a device which is separate or is combined with the same machine, and consists of a second gear-box similar to the one above mentioned, but having a less capacity of transmission, i. e. adapted to transmit only a smaller driving torque, with a different range if required, and the entering shaft of which is driven by the gear-wheel 62 or by any other means. The said gear-box, which is constructed in order to obtain the necessary speeds for the control of pitch and feed, may be entirely controlled by combination switches such as are above described, these being within reach of the workman.

In certain cases, the action upon the switches of the two gear-boxes may be synchronized with the control of the pivoting movement of the turrets or tool supports of the machine, and thus the workman can make a simple movement in the shortest time, in order to stop the spindle, bring forward the proper tool, and provide for the proper rate of rotation and feed, for the lathe work which he is commencing.

Having now described my invention what I claim as new and desire to secure by Letters Patent is:

1. In combination, a casing, a driving shaft, an intermediate shaft and a driven shaft, said three shafts being supported in line in said casing, a number of successive planetary sets each consisting of three members coaxial with said shafts and comprising two concentrically disposed gears, and a pinion carrier, of at least one planetary pinion rotatably mounted on said carrier and in mesh with said gears, of two electromagnets respectively connected with said casing and with one of said three members, and of an armature connected with a second of said three members and adapted to be attracted by said electromagnets, said pinion carriers being connected in the first set next the driving shaft with the corresponding armature so as to produce selectively a forward drive and a reverse drive, in the last set with said intermediate shaft, and in each of the other sets with one of the two concentrically disposed gears of the following set which is not connected with the armature of said following set, and the two concentrically disposed gears of the first set being connected respectively to the driving shaft and to the gear of the second set which is not connected with the armature of said second set, means adapted to energize selectively one electromagnet in each set, three elements coaxial with said shafts and comprising a sun wheel secured to said intermediate shaft, an orbit wheel concentrically disposed with relation to said sun wheel and rotatably mounted on said intermediate shaft and a support secured to said driven shaft, at least one planetary wheel rotatably mounted on said support and in mesh with said sunwheel and said orbit wheel, and means adapted to connect selectively said orbit wheel with said casing and with another of said three elements.

2. A combination as claimed in claim 1, in which said means adapted to connect selectively said orbit wheel with said casing and with another of said elements consists of a sleeve slidably mounted on said orbit wheel, and cooperating surfaces provided on said sleeve, on said casing and on said sun wheel adapted to be brought selectively into engagement when said sleeve is moved in either direction on said intermediate shaft.

3. A combination as claimed in claim 1, in which the transmission ratio of said sun wheel, orbit wheel, support and planetary wheel when said orbit wheel is stationary is smaller than the smallest transmission ratio obtainable with all the planetary sets which follow the first planetary set.

4. A combination as claimed in claim 1, in which said planetary wheel is formed of two parts of different diameters, the part of smaller diameter being in mesh with said orbit wheel, and the part of larger diameter being in mesh with said sun wheel, the sizes of said wheels being so chosen that the transmission ratio of said sun wheel, orbit wheel, support and planetary wheel when said orbit wheel is stationary is smaller than the smallest transmission ratio obtainable with all the planetary sets which follow the first planetary set.

5. A combination as claimed in claim 1, in which the armature of the last set comprises two parts adapted to slide axially with relation to each other and to be attracted respectively by the two corresponding electromagnets, and in which means are adapted to energize said two corresponding electromagnets simultaneously, so as to ensure the braking of the intermediate shaft and of the driven shaft.

6. A combination as claimed in claim 1, in which said means for energizing one electromagnet in each set comprises a source of electric current, a first switch provided with two stationary contact pieces connected respectively with the two electromagnets of the first planetary set and provided with a movable contact piece connected with said source of current and adapted to engage selectively one of said stationary contact pieces, a second switch provided with a number of groups of pairs of stationary contact members equal to the number of planetary sets following the first planetary set, each group corresponding to one of said planetary sets following the first set, and the two contact pieces of each pair being connected respectively with the two electromagnets of the corresponding set, said second switch being also provided with a movable element carrying for each group of stationary contact members a movable contact member adapted to engage selectively the stationary contact members of said group, and connecting means between the movable contact piece of the first switch and the movable contact members of said second switch adapted to connect electrically said movable contact piece and said movable contact members for the two positions in which said movable contact piece engages said stationary contact pieces.

7. In combination, a casing, a driving shaft, an intermediate shaft and a driven shaft, said three shafts being supported in line in said casing, a number of successive planetary sets each consisting of three members coaxial with said shafts and comprising two concentrically disposed gears and a pinion carrier, of at least one planetary pinion rotatably mounted on said carrier and in mesh with said gears, of two electromagnets respectively connected with said casing and with one of said three members, and of an armature connected with a second of said three members and adapted to be attracted by said electromagnets, said pinion carriers being connected in the first set next the driving shaft with the corresponding armature so as to produce selectively a forward drive and a reverse drive, in the last set with said intermediate shaft, and in each of the other sets with one of the two concentrically disposed gears of the following set which is not connected with the armature of said following set, and the two concentrically disposed gears of the first set being connected respectively to the driving shaft and to the gear of the second set which is not connected with the armature of said second set, and the armature of the last set being formed of two parts adapted to slide axially with relation to each other and to be attracted respectively by the two electromagnets of said last set, a source of electric current, a first switch provided with two stationary contact pieces connected respectively with the two electromagnets of the first planetary set, with two stationary contact pieces connected together, with stationary contact means connected with the two electromagnets of the last planetary set, and with a movable contact piece connected with said source of current and adapted to engage selectively one of the stationary contact pieces connected with the electromagnets together with one of the stationary contact pieces connected together or to engage said stationary contact means with the two electromagnets of the last set or to remain out of engagement with all of said stationary contact pieces and contact means, a second switch provided with a number of groups of pairs of stationary contact members equal to the number of planetary sets following the first planetary set, each group corresponding to one of said planetary sets following the first set, and the two contact pieces of each pair being connected respectively with the two electromagnets of the corresponding set, said second switch being also provided with a movable element carrying for each group of stationary contact members a movable contact member adapted to engage selectively the stationary contact members of said group, connecting means between the movable contact members of said second switch and said stationary contact pieces connected together of said first switch, three elements coaxial with said shafts and comprising a sun wheel secured to said intermediate shaft, an orbit wheel concentrically disposed with relation to said sun wheel and rotatably mounted on said intermediate shaft, and a support secured to said driven shaft, at least one planetary wheel rotatably mounted on said support and in mesh with said sun wheel and said orbit wheel, and means adapted to connect selectively said orbit wheel with said casing and with another of said three elements whereby the rotation of said intermediate and driven shafts may be braked, stopped or reversed without changing the position of the second switch.

JEAN COTAL.